United States Patent [19]
Brokenshire et al.

[11] Patent Number: 5,428,716
[45] Date of Patent: Jun. 27, 1995

[54] SOLID-CLIP METHODOLOGY AND ARCHITECTURE FOR CLIPPING SOLID MODELS AND DISPLAYING CROSS-SECTIONS USING DEPTH-BUFFERS

[75] Inventors: Daniel A. Brokenshire, Saugerties, N.Y.; Abraham E. Megahed, Madison, Wis.; Jarolsaw R. Rossignac; Bengt-Olaf Schneider, both of Ossining, N.Y.

[73] Assignee: International Business Machines Corporation, Armonk, N.Y.

[21] Appl. No.: 815,105

[22] Filed: Dec. 26, 1991

[51] Int. Cl.⁶ .............................................. G06T 15/40
[52] U.S. Cl. ...................... 395/121; 395/122; 395/127; 395/134
[58] Field of Search ............... 395/121, 122, 127, 134, 395/120, 126, 135, 129

[56] References Cited

U.S. PATENT DOCUMENTS

| | | | |
|---|---|---|---|
| 3,816,726 | 6/1974 | Sutherland et al. | 395/127 X |
| 4,679,041 | 7/1987 | Fetter et al. | 345/139 |
| 4,766,556 | 8/1988 | Arakawa | 395/124 |
| 4,821,213 | 4/1989 | Cline et al. | 395/126 X |
| 4,825,391 | 4/1989 | Merz | 364/526 |
| 4,836,688 | 5/1989 | Kimura | 364/413.22 |
| 4,845,651 | 7/1989 | Aizawa et al. | 395/125 |
| 4,855,938 | 8/1989 | Gonzalez-Lopez et al. | 395/122 |
| 4,888,712 | 12/1989 | Barkans et al. | 395/134 |
| 4,907,174 | 3/1990 | Priem | 395/122 |
| 4,941,111 | 7/1990 | Sfarti | 395/134 X |
| 4,984,157 | 1/1991 | Cline et al. | 395/124 X |
| 5,003,497 | 3/1991 | Priem | 395/127 X |
| 5,012,433 | 4/1991 | Callahan et al. | 395/134 |
| 5,027,292 | 6/1991 | Rossignac et al. | 395/122 |
| 5,040,130 | 8/1991 | Chang et al. | 395/134 |
| 5,051,737 | 9/1991 | Akeley et al. | 395/134 |
| 5,113,490 | 5/1992 | Winget | 395/134 X |
| 5,249,264 | 9/1993 | Matsumoto | 395/121 X |
| 5,268,995 | 12/1993 | Diefendorff et al. | 395/122 |
| 5,309,550 | 5/1994 | Takahashi | 395/121 |

FOREIGN PATENT DOCUMENTS 0376181A  4/1990  European Pat. Off. .

*Primary Examiner*—Raymond J. Bayerl
*Attorney, Agent, or Firm*—Perman & Green

[57] ABSTRACT

A method, and apparatus for practicing the method, processes pixels to display a cross-sectioned image of a solid object. The method includes the steps of, for each pixel that projects onto the solid object, (a) determining, as a function of a depth of a clipping plane at a pixel, a parity of the pixel; and (b) for each pixel determined to have a predetermined type of parity, displaying the pixel with a visual characteristic selected to indicate that the pixel is a pixel that projects onto material that is within an interior of the solid object.

23 Claims, 8 Drawing Sheets

SOLID-CLIP METHODOLOGY AND ARCHITECTURE FOR CLIPPING SOLID MODELS AND DISPLAYING CROSS-SECTIONS USING DEPTH-BUFFERS

FIELD OF THE INVENTION

This invention relates generally to solid modelling and, in particular, to methods and apparatus for displaying a solid model that is clipped, or cross-sectioned, by a clipping plane.

BACKGROUND OF THE INVENTION

Solid modeling is a known technique for modeling objects with a computer and for specifying a design and a manufacturing process of such objects. A method for interactively creating, displaying, and manipulating solid models is required to make efficient use of the descriptive power of solid modeling. Methods for the fast display of solids described by Constructive Solid Geometry (CSG), using multiple z-buffers, have been previously described. By example, in commonly assigned U.S. Pat. No. 5,027,292, issued Jun. 25, 1991, entitled "Multiple Depth Buffers for Graphics and Solid Modelling" by J. Rossignac et al., there is described the use of front and back z-buffers.

Another important consideration for displaying solids is an ability to selectively display only certain parts of the solids. These parts are defined by specifying a subspace of the entire screen space, or by defining a cross-section of the solid. Typically, these subspaces are delimited by planes, referred to in the art as clipping planes. The cross-section may be defined as the intersection of the solid with the clipping plane. Efficient clipping operations provide several valuable interactive operations.

First, the use of a clipping plane or clipping planes clarifies the image by clipping away, or visually removing, portions of the solid that are not of interest to a user.

Second, the use of a clipping plane or clipping planes enables the user to view the interior structure of a solid by clipping away those portions of the solid that enclose an interior region of interest.

Third, the use of a clipping plane enables the user to gain an understanding of the shape of complex solids by inspecting various cross-sections that are defined by appropriate positioning of the clipping plane or clipping planes.

Displaying clipped solids should ideally result in images that are as close to the intended operation, namely cross-sectioning the solid, as possible. Therefore, it is desirable that the image of the interior of an object be easily identified on the display. Also, the user benefits most from the clipping operation if it is accomplished interactively, i.e. a change in the position of the clipping plane is reflected in the image with little latency. Therefore, it is desirable that clipping be implemented with relatively simple logical and arithmetic operations that can be readily performed by, or supported by, hardware.

Many traditional surface clipping techniques discard those portions of the faces of the solid that lie outside of the clipping volume. As a result, the backface(s) of the solid are displayed at those pixels where the front surface(s) have been clipped away. However, this is undesirable because it does not reflect the reality that solids are partially or entirely filled with material.

Traditionally, the clipping of solids has been accomplished with clipping polygons that bound the solid. Several techniques for polygon clipping are known. By example, Sutherland and Hodgman describe in "Reentrant Polygon Clipping" CACM, 18(1), pp. 32–42, January 1974, a technique that clips an arbitrary connected polygon against convex clipping regions or a convex clipping volume. This technique successively clips each polygon against each of the clipping planes. During this process a new polygon is generated whose vertices lie inside of, or on, the boundary of the clipping volume. Portions of the original polygon that are outside of the clipping volume are discarded.

Liang and Barsky describe in "An Analysis and Algorithm for Polygon Clipping" CACM 26(11), November 1983 (Corrigendum, CACM, 27(2)), February 1984, a more efficient technique for clipping polygons against a rectangular clipping window, These authors reduce the computational effort by determining which sides of a rectangle might be intersected by an edge of the polygon to be clipped. Again, regions outside of the clipping rectangle are removed from the data structure by generating a new polygon having vertices that are contained in the clipping rectangle.

Weiler describes in "Polygon Comparison Using a Graph Representation", SIGGRAPH '80, a method to clip a polygon against another arbitrary polygon. The technique divides the supporting plain of the polygons into portions that are covered by none, one, or both polygons. The method selects those portions that are covered by both polygons. The other portions are discarded.

As is evident, a common property of all of these techniques is that portions of the polygon outside the clipping volume are removed. When these polygons bound a solid, clipping against the front faces reveals the interior of the volume of the solid and displays the back faces, as seen in FIG. 2a and FIG. 2b. In that both the front faces and the back faces would be subject to the same lighting calculations, such an image may be visually confusing.

What is required instead, when a front of a solid is clipped by a front clipping plane, is to provide a visual effect of a cross-section through the solid. By example, the intersection of the front clipping plane and the solid should be displayed in, by example only, a constant color and/or a cross-hatched pattern. This approach would more accurately model the reality that a solid is not empty space bounded by surfaces, but contains visually distinct material.

It is thus one object of the invention to provide a clipping technique that detects those pixels that project onto a region where the interior of a cross-sectional solid is displayed so as to render these pixels in a visually distinct manner. By example, interior pixels may be flat shaded while surface pixels are rendered, taking into account the scene illumination.

It is a further object of the invention to provide for a correct rendering of solid objects by the use of a plurality of depth buffers, in conjunction with a pixel parity flag memory plane, so as to detect and make visually apparent interior material that is exposed by one or more clipping planes or surfaces that intersect a solid object.

SUMMARY OF THE INVENTION

The foregoing and other problems are overcome and the objects of the invention are realized by a solid clipping method, and apparatus for accomplishing the method.

In general, a method of the invention processes pixels to display a cross-sectioned image of a solid object. The method includes the steps of, for each pixel that projects onto the solid object, (a) determining, as a function of a depth of a clipping plane at a pixel, a parity of the pixel; and (b) for each pixel determined to have a predetermined type of parity, displaying the pixel with a visual characteristic selected to indicate that the pixel is a pixel that projects onto material that is within an interior of the solid object.

By example, the clipping plane is a front clipping plane, and the step of determining a parity of a pixel includes a step of maintaining a record of a number of faces of the solid object that are traversed by a projection of the pixel, the faces being behind the front clipping plane. The step of maintaining includes a step of generating a record of pixel coordinates of pixels that bound a region of the solid object and that lie behind the front clipping plane.

The predetermined type of parity is odd parity. A pixel is determined to have odd parity if an odd number of faces of the solid object are traversed by the projection of that pixel.

In one embodiment of the invention the method includes an initial step of projecting onto the clipping plane any portion of the solid object that extends beyond the clipping plane.

As was stated, in one embodiment of the method of the invention surface points are projected that lie outside of the clipping volume (i.e., behind the clipping plane) onto the clipping plane. By this projection, several surfaces of the object may be mapped into the same points on the clipping plane. This condition is detected and processed during a second pass over the object, and the involved surfaces are eliminated. This procedure is referred to herein as the regularization of a solid.

The method of the invention provides a capability to assign various colors to an interior region of a solid that is exposed by clipping the solid against a front clipping plane. The interior region may be displayed in a constant color, or may be displayed correctly shaded by taking into consideration a normal vector of the cross-section and interior material properties.

One embodiment of the method enables the display of a clipped complement of a solid. This is useful to "look ahead" while inspecting a complicated scene by moving the clipping plane.

BRIEF DESCRIPTION OF THE DRAWINGS

The above set forth and other features of the invention are made more apparent in the ensuing Detailed Description of the Invention when read in conjunction with the attached Drawings, wherein:

FIGS. 2a, 2b, and 2c illustrate a prior art technique for clipping a bounded solid, wherein FIG. 2a shows the solid before clipping, FIG. 2b shows the solid after clipping, and FIG. 2c shows the resulting image of the clipped solid;

FIGS. 3a, 3b, and 3c illustrate the result of the solid clipping method of the invention when clipping a bounded solid, wherein FIG. 3a shows the solid before clipping, FIG. 3b shows the solid after clipping, and FIG. 3c shows the resulting image of the clipped solid, wherein the back face B is not seen;

FIGS. 4a and 4b illustrate the determination of odd and even parity of faces behind a clipping plane, wherein FIG. 4a shows a solid before clipping and FIG. 4b shows the solid after clipping;

FIGS. 5a and 5b illustrate the determination of odd and even parity of faces in front of a clipping plane, wherein FIG. 5a shows a solid before clipping and FIG. 5b shows the solid after clipping;

FIGS. 7a–7d illustrate the clipping of a solid in accordance with a method of the invention, wherein FIG. 7a illustrates a scene in world coordinates, FIG. 7b illustrates the scene after projection onto the clipping plane, FIG. 7c illustrates the contents of buffers and a parity buffer after a first pass of the method, and FIG. 7d illustrates the contents of the buffers and a cross-section of the solid after a second pass of the method;

FIG. 8a depicts a solid described as the intersection of solids A and B, while

DETAILED DESCRIPTION OF THE INVENTION

Figure 1A:
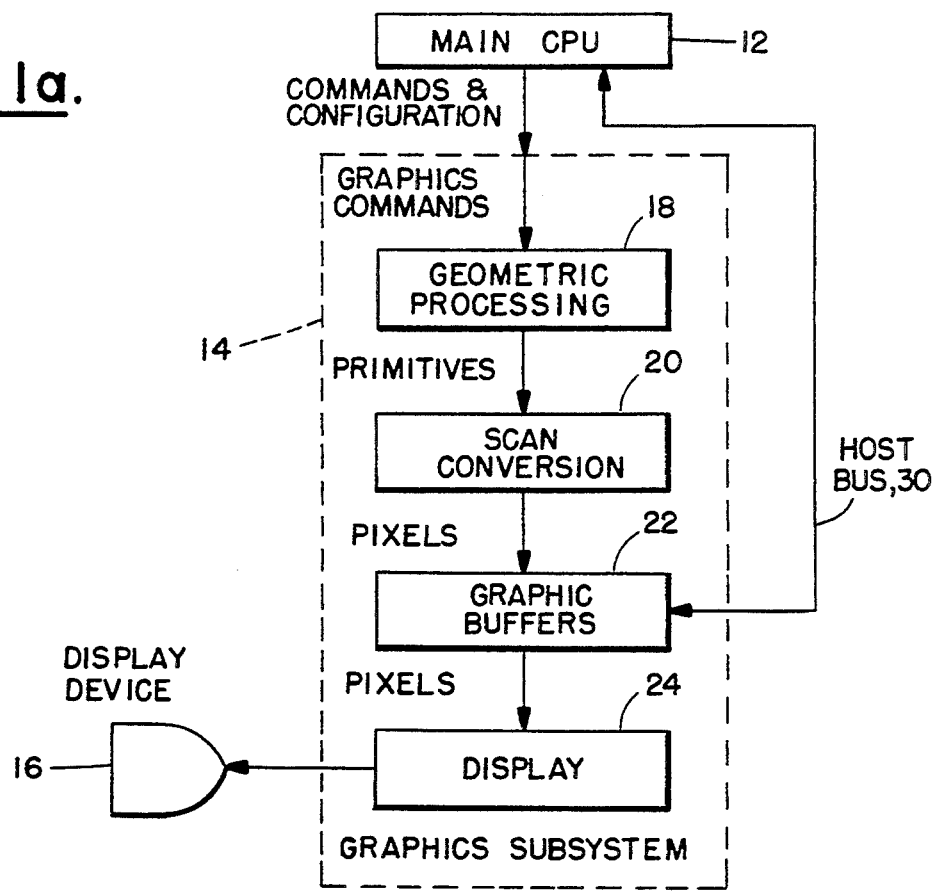
FIG. 1a is a block diagram of a raster graphics system suitable for use in practicing the invention.

A raster graphics system 10, as illustrated in FIG. 1a, includes a main (Host) processor 12 and a graphics subsystem 14. The Host processor 12 executes an application program and dispatches graphics tasks to the graphics subsystem 14.

The graphics subsystem 14 includes several components that perform operations necessary to prepare geometric entities for display on a raster display device 16. For the purposes of describing the invention, a model of the graphics subsystem 14 is employed that contains the following functional units. It should be realized that this particular model is not to be construed in a limiting sense upon the practice of the invention.

A Geometric Processing unit 18 performs geometric and perspective transformations, as well as clipping against screen (window) boundaries. The resulting graphics primitives, e.g. vertices, lines, triangles, etc., are described in screen space coordinates.

A Scan Conversion (Rasterization) unit 20 breaks down the graphics primitives into raster information, i.e. a description of display screen pixels that are covered by the graphics primitives.

A Graphics Buffer unit 22 receives and stores the pixels, or display screen picture elements.

A Display unit 24 receives pixels from the Graphics Buffer unit 22 and transforms these pixels into information displayed on the output device 16, typically a raster screen.

This invention specifically concerns, and provides novel methods and apparatus for, the Graphics Buffer 22. More specifically, this invention provides a method for clipping solid objects described by their bounding surfaces. At each pixel, the method distinguishes between points on a surface of a solid and points interior to the solid, and that lie on a front clipping plane.

Several embodiments of the invention are now described. Also described is the use of hardware support for front and back clipping planes, and the support of arbitrarily shaped, possibly non-planar, front and back clipping surfaces.

For the purposes of describing the invention it is assumed that solids are described as polyhedra, i.e. by their bounding polygons. Each of the polygons is represented as an ordered list of vertices. However, the invention is not limited to only bounding polygons. That is, the boundaries of a solid can be of arbitrary type, such as algebraic surfaces, B-spline surfaces, NURBS surfaces, voxel surfaces, etc. That is, the described method is independent of the type of surfaces bounding the solid. For simplicity, it will be assumed that the solid is bounded by planar polygons, i.e. the solid is a polyhedron. Also, the method is generally described in the context of a front clipping plane that is perpendicular to the depth, or z-axis. However, and as will be made apparent, the method is also well suited to clip against arbitrarily shaped clipping planes having any orientation to the z-axis, and with combinations of clipping planes that define complex clipping surfaces.

Furthermore, the term "solid" or "solid object" as employed herein, is intended to encompass objects that are completely filled with material, such as a ball bearing, and also objects that are only partially filled with material, such as an engine block or a pocket watch.

A first embodiment of the invention is now described.

Standard hardware rendering architectures provide a capability to define front and back clipping planes against which objects to be rendered are trimmed. Those portions of objects behind the front clipping plane and in front of the back clipping plane are written into pixel buffers for color and depth.

Figure 4A:
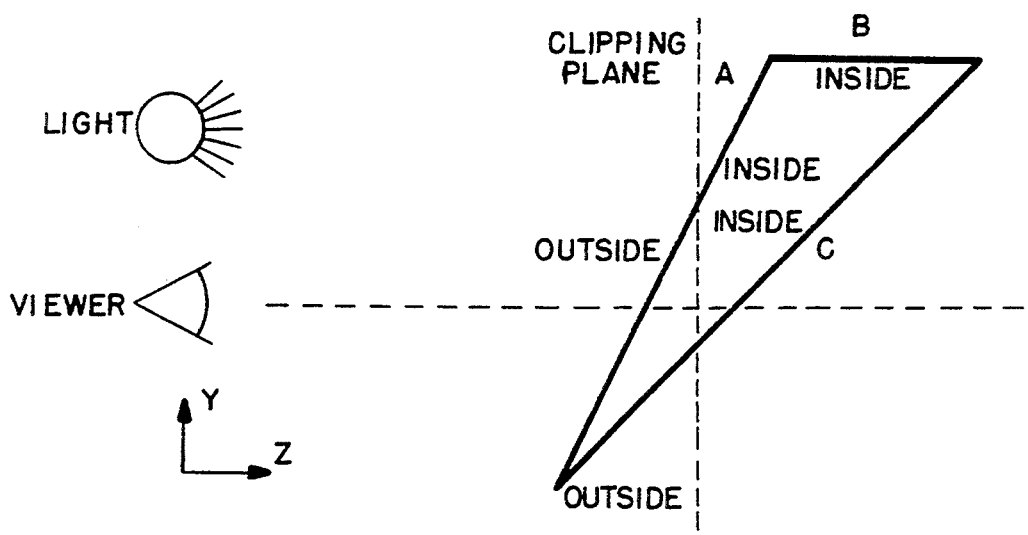
Figure 4B:
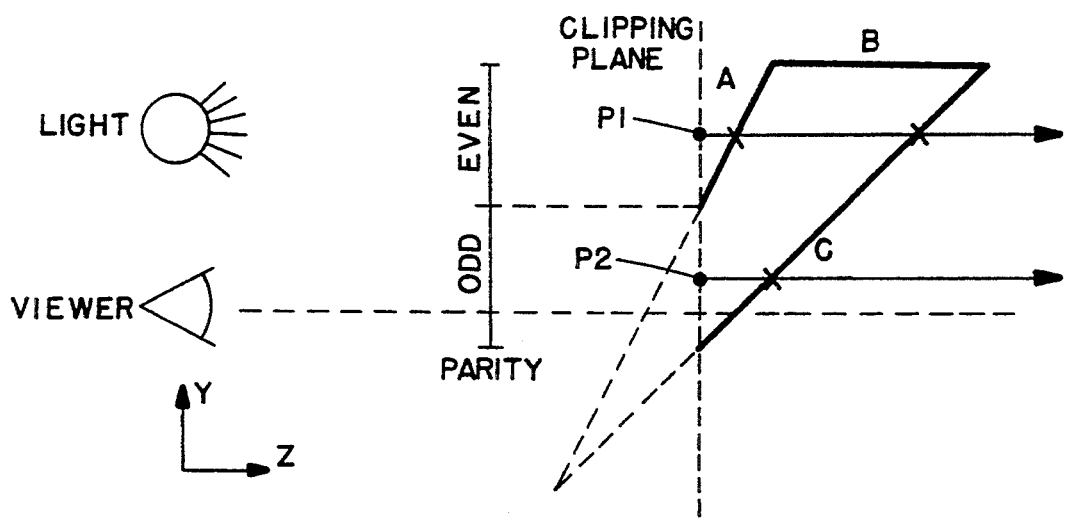

At each pixel that projects onto a particular solid, the method of the invention maintains a record of the parity of the number of faces rendered for the solid. As illustrated in FIGS. 4a and 4b, the parity is even where the clipping plane does not intersect the solid. Conversely, the parity is odd where the clipping plane intersects the solid and thus produces a cross section through the solid.

That is, in the example of FIG. 4b, for pixel (P1) two faces (A and C) of the solid lie behind the pixel (along the z-axis), and the parity of P1 is even. For pixel P2, only one face (C) of the solid lies behind the pixel, and the parity of P2 is odd. In general, if an odd number of faces lie behind a pixel the parity of the pixel is odd, and if an even number of faces lie behind a pixel, the parity of the pixel is even.

It is noted that commonly assigned U.S. patent application Ser. No. 07/672,058, filed Mar. 12, 1991, now U.S. Pat. No. 5,402,532, entitled "Direct Display of CSG Expression by the Use of Depth Buffers" by David A. Epstein, Jaroslaw R. Rossignac, and Jeffrey W. Wu describes the use of a front-facing flag in the context of a depth interval buffer. The front-facing flag is used to indicate the parity of points and to determine if a particular point lies inside of or outside of a primitive.

After all solids have been rendered during a first pass, the method of the invention paints those pixels having an odd parity, i.e. pixels showing a cross-section surface, with a selected color and/or pattern of the cross-section surface. The effect of this operation is shown in FIGS. 3a, 3b, and 3c.

Figure 2A:
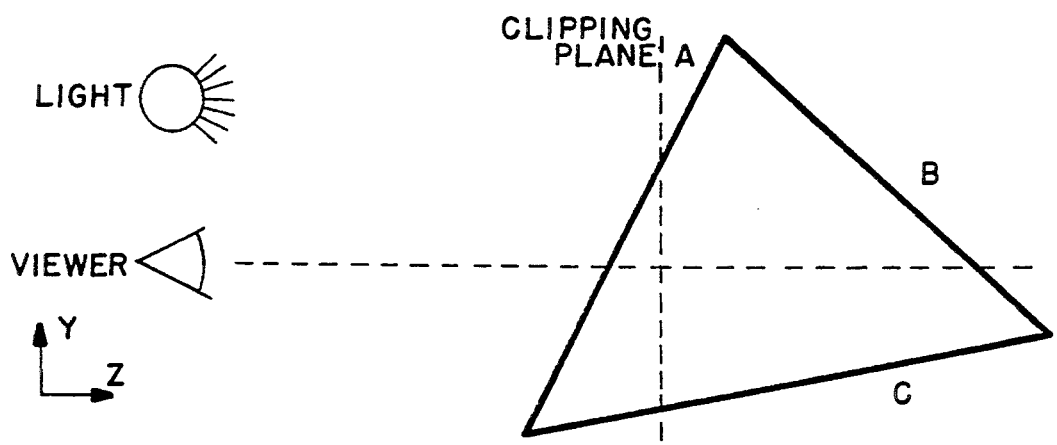
Figure 2B:
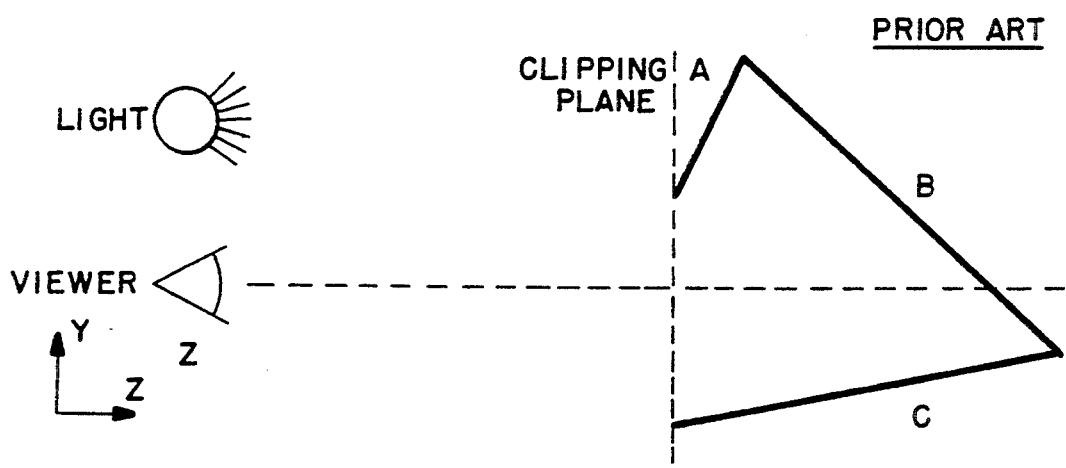
Figure 2C:
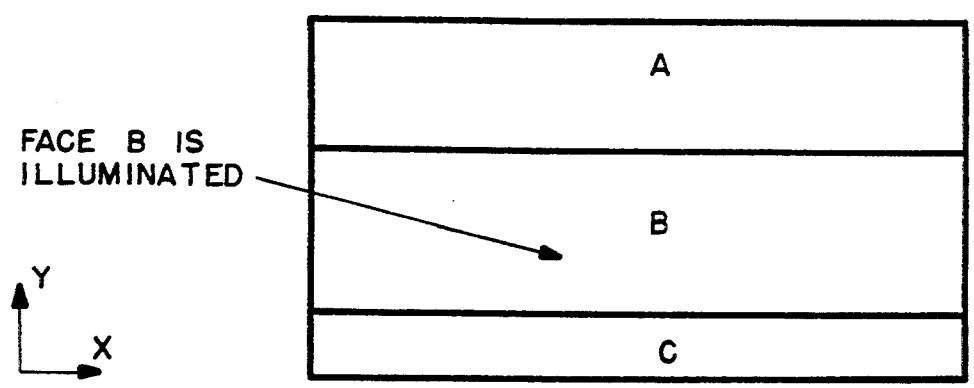
Figure 3A:
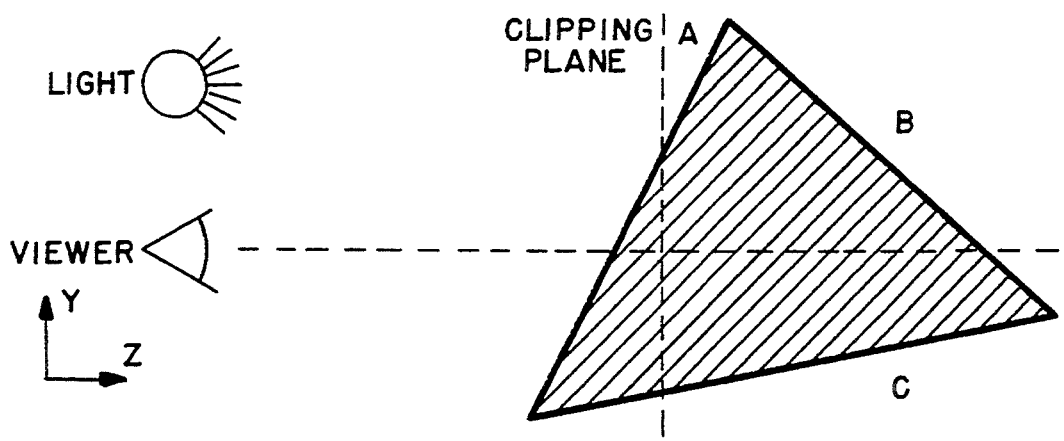
Figure 3B:
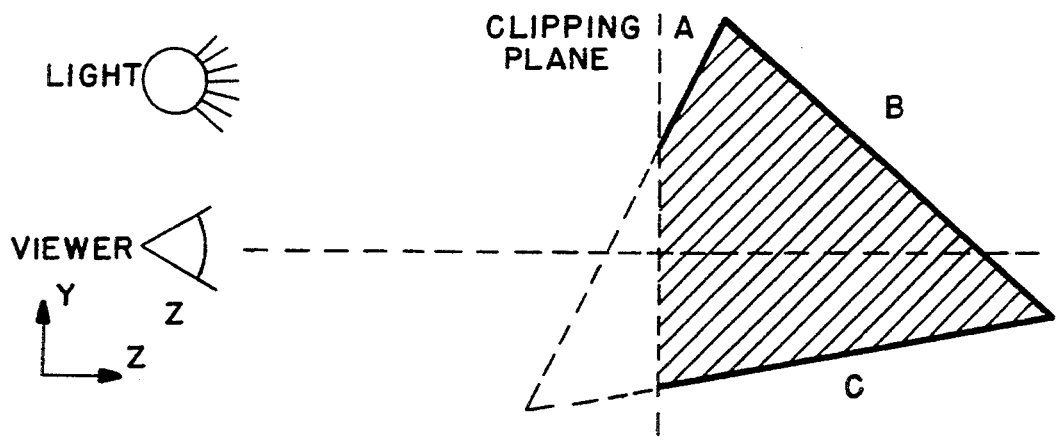
Figure 3C:
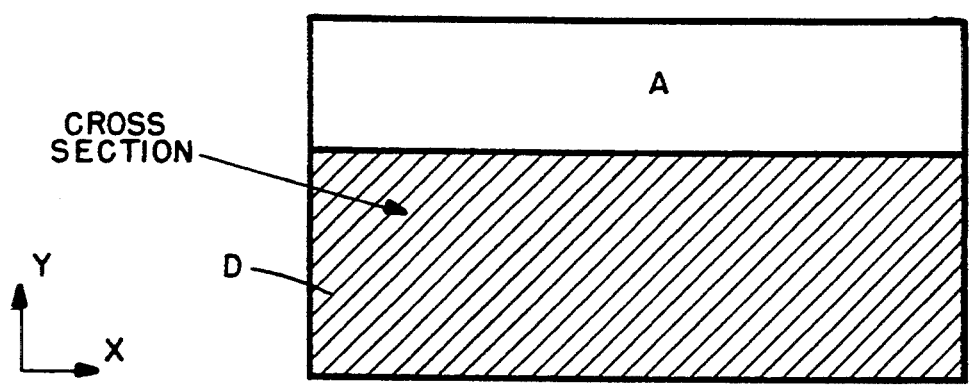

FIG. 3a shows a solid having a front surface A and rear surfaces B and C. Points on surface A project onto pixels that are viewed by a viewer. Each pixel that projects onto a point on surface A has at least one display characteristic, such as color, and also a depth associated therewith. The depth is measured along the z-axis and referenced to a viewing plane. In rendering these pixels lighting and other visual considerations may be taken into account. FIG. 3b shows the effect of a clipping plane that cross-sections the solid. FIG. 3c shows the solid as it appears to the viewer when displayed in accordance with the invention. A comparison of FIG. 3c to FIG. 2c shows that the visually confusing display of the rear faces B and C is eliminated in FIG. 3c. Instead, the viewer is presented with a surface (D) that accurately represents the material that is interior to the solid. If the solid contains any internal structure or voids, intersected by the clipping plane, these are also accurately rendered.

Figure 9:
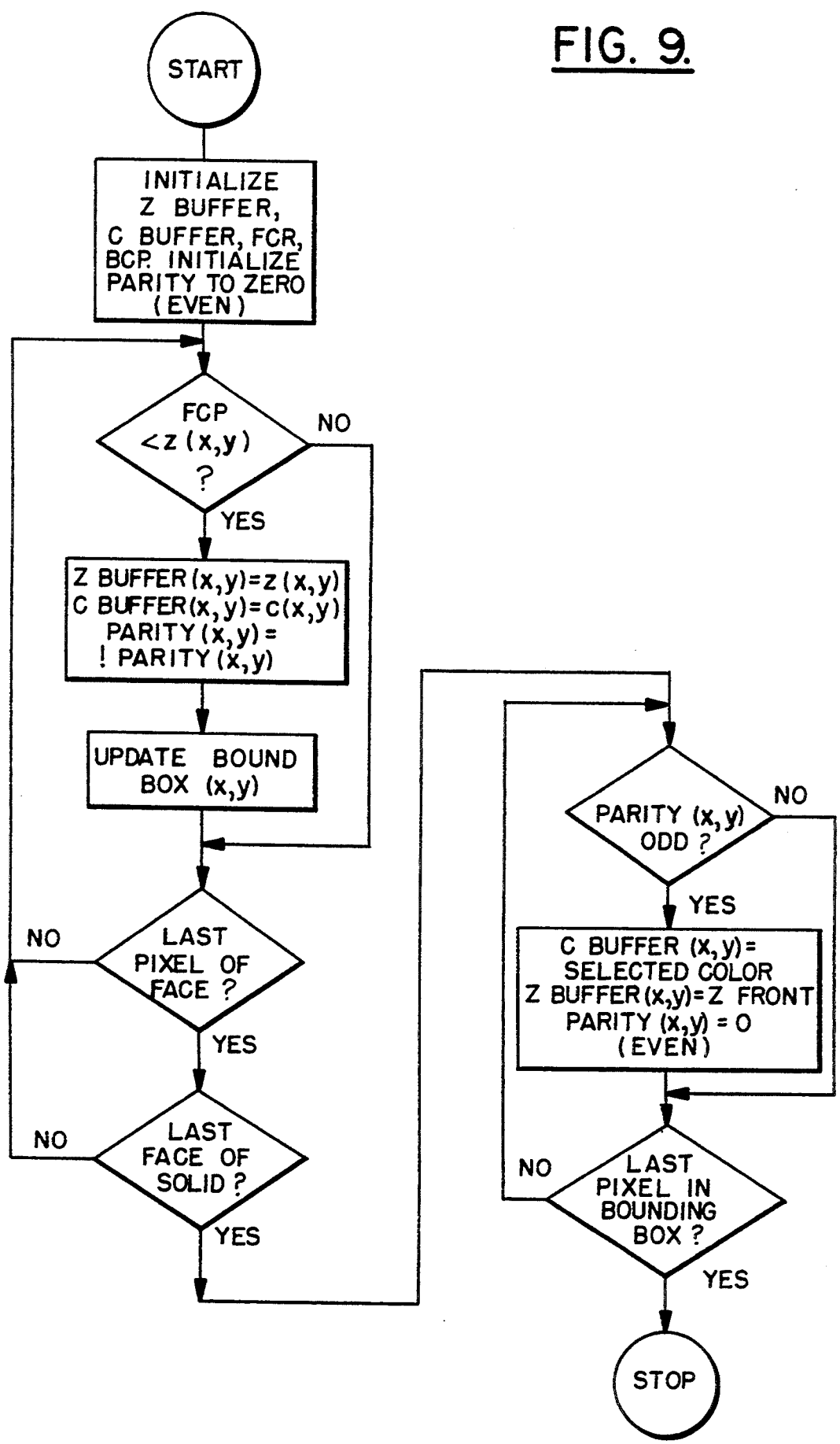
FIG. 9 is a flowchart depicting an embodiment of the method of the invention.

The following pseudo-code, in conjunction with the flowchart of FIG. 9, describes this technique.

```
/*
 *   SOLID CLIPPING:
 *   The position of solids is not restricted to
 *       z-buffer depth range.
 *
 *   'zbuffer' and 'cbuffer' store the depth and the
 *       color at each pixel
 *   'parity' is a bit plane for storing the parity
 *       of the number of faces projected onto a
 *       particular pixel.
 *   'zfront' and 'zback' give the depth of the front
 *       and back clipping plane at each pixel.
 *
 *   'FCP' and 'BCP' store the depth of the hardware
 *       front and back clipping planes
 */
/*
 *   Initialization
 */
FORALL pixels (x,y) DO
{
    zbuffer(x,y) = zback ;
    cbuffer(x,y) = cback ;
    parity(x,y) = 0;
}
FCP = zfront ;
BCP = INFINITY ;
FORALL solids s Do
{
    CLEAR_BBX ;/* A bounding box encloses all
                   pixels where the parity bit is changed. */
/*
 *   Render all solids using the
 *       front and back clipping planes FCP and BCP,
 *       respectively.
 */
FORALL faces f of s DO
    FORALL pixels (x,y) of f DO
        /* The following operation may be hardware
           supported */
        IF (FCP < z(x,y))
        {
            if (z(x,y) < zbuffer(x,y))
            { zbuffer(x,y) = z(x,y) ;
              cbuffer(x,y) = c(x,y) ;
            }
```

```
        parity(x,y) = !parity(x,y) ;
        UPDATE_BBX(x,y) ;
    }
/*
 *  Assign a color to the pixels that contain
        cross-sections and update the z-buffer at
        those pixels.
 */
FORALL pixels (x,y) in bounding box DO
    IF (parity(x,y))
    {
        cbuffer(x,y) = color_of_cross_section(s) ;
        zbuffer(x,y) = zfront ;
        parity(x,y) = 0 ; /* Reset parity to avoid
            reinitialization for the next solid. */
    }
}
```

For this method, the back clipping plane should not intersect any of the displayed solids. For example, the back clipping plane can be temporarily positioned behind the farthest solid by setting it to INFINITY, as shown above.

Figure 1B:
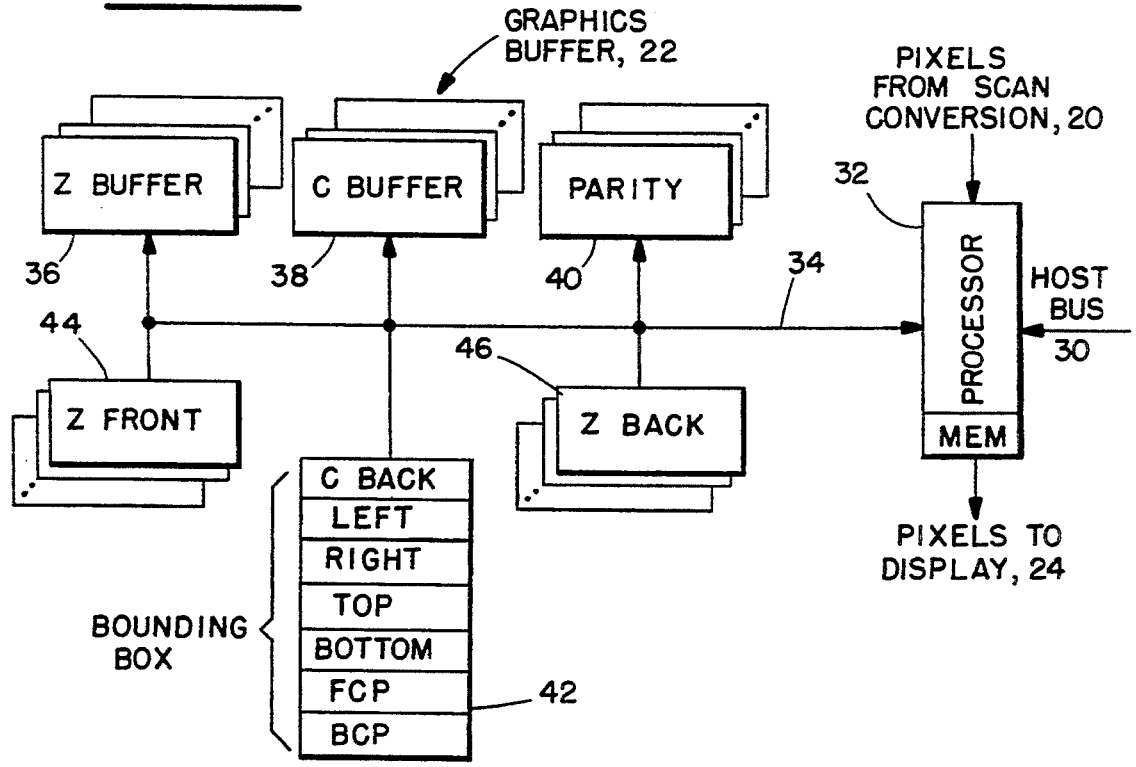
FIG. 1b is a block diagram of the graphics buffer of FIG. 1a that implements the method of the invention.

Referring now to FIG. 1b there is shown an embodiment of the graphics buffer 22 that is suitable for implementing the method described above. The graphics buffer 22 includes a processor 32 that is bidirectionally coupled by a bus 34 to a plurality of storage locations. These storage locations include a zbuffer (depth) 36, a cbuffer (color) 38, and a parity buffer 40. Each of these buffers includes storage for a plurality of pixels. For example, if the display device displays 1024×1024 pixels, then there are provided up to $10^6$ abuffers 36, $10^6$ cbuffers 38, and $10^6$ parity buffers 40. These buffers are typically implemented as planes of memory devices, such as dynamic RAMs. Also coupled to the processor 32 by the bus 34 is a storage device 42 that stores the variables utilized by the method described above. These variables include cback, FCP, and BCP. Storage is also provided for the bounding box (BBX), which includes registers for defining the left, right, top, and bottom pixel coordinates for a region of interest. For the methods of the invention the region of interest encompasses those pixels wherein the parity of pixels is changed, some of these pixels projecting onto an interior surface of the solid that is coplanar with and adjacent to the clipping plane. Also coupled to the processor 32 is a host bus 30 that provides initialization and other information for executing the methods of the invention. The processor 32 receives pixels from the scan conversion unit 20 and, after processing same in accordance with the methods of the invention, provides pixels to the display 24. As such, the processor 32 includes an instruction memory 32a that contains instructions for executing the method of the invention. For some embodiments of the invention a zfront buffer 44 and a zback buffer 46 may also be provided, as described below.

Another suitable embodiment for the graphics buffer 22 is disclosed in commonly assigned and copending U.S. patent application Ser. No. 07/813,318, filed Dec. 24, 1991, entitled "An Extendable Multiple Image-Buffer for Graphics Systems" by Bengt-Olaf Schneider, now U.S. Pat. No. 5,274,760, issued Dec. 28, 1993.

It should be noted that, for the example described thus far, separate buffers (zfront 44 and zback 46) are not required to be assigned for storing the front and back clipping planes, in that the clipping planes are normal to the z-axis and thus have a uniform and constant depth across the entire screen. As such, the pseudocode described above assigns zfront to FCP, the register that controls the hardware clipping. However, for other embodiments described below, wherein the clipping plane or clipping surface does not have a uniform depth, the buffers zfront 44 and zback 46 are assigned for storing the depth of the clipping plane or clipping surface at a plurality of points.

At each pixel, the above described embodiment of the Solid Clipping method determines the parity of all faces of a solid that are behind the front clipping plane. In order to obtain the correct parity, this requires that no faces are clipped by the back clipping plane.

This constraint may be overcome by determining the parity of the number of faces in front of the front clipping plane, as illustrated in FIG. 4.

The following pseudo-code employs hardware supported clipping against front and back clipping planes. In a first pass, solids are scanned to identify pixels that show a cross-section. In a second pass, the solids are scanned again to render those pixels that are outside of cross-sections.

```
/*
 *  SOLID CLIPPING METHOD 2
 *  The position of solids is not restricted to
        z-buffer depth range.
 *
 *  'zbuffer' and 'cbuffer' store the depth and the
        color at each pixel.
 *  'parity' is a bit plane for storing the parity
        of the number of faces projected onto a
        particular pixel.
 *
 *  'zfront' and 'zback' give the depth of the front
        and back clipping planes at each pixel.
 *
 *  'FCP' and 'BCP' store the depth of the front and
        back clipping planes.
 */
/*
 *  Initialization
 */
FORALL pixels (x,y) DO
{
    zbuffer(x,y) = zback ;
    cbuffer(x,y) = cback ;
    parity(x,y) = 0 ;
}
FCP = -INFINITY ; /* ... or any z-value in front of
        every solid */
BCP = zfront ;
/*
 * PASS 1: Render all solids and determine for each
        pixel the parity of the number of faces
        in front of 'zfront'.
 */
FORALL solids s DO
{
    CLEAR_BBX ; /* The bounding box encloses all
        pixels where the parity bit is
        changed. */
    FORALL faces f in s DO
        FORALL pixels (x,y) covered by f DO
            /* The following operation may be hardware
                supported */
            IF (FCP < z(x,y) <=BCP)
            {
                parity(x,y) = !parity(x,y) ;
                UPDATE_BBX(x,y) ;
            }
    FORALL pixels (x,y) in bounding box DO
        IF (parity(x,y))
        {
            cbuffer(x,y) = color_of_cross_section(s) ;
            zbuffer(x,y) = zfront ;
            parity(x,y) = 0 ; /* Reset parity to avoid
                reinitialization for the
```

```
                                -continued
                                next solid. */
     }
 }
 /*
  * PASS 2:  Render all solids and draw pixels that
            are behind 'zfront' and in front of
            'zback'.
  */
 FCP = zfront ;
 BCP = zback ;
 FORALL solids s DO
 FORALL faces f in s DO
     FORALL pixels (x,y) covered by f DO
     /* The following operation may be hardware
        supported */
     IF (FCP < z(x,y) < = BCP)
         IF (z(x,y) < zbuffer(x,y))
         {
             zbuffer(x,y) = z(x,y) ;
             cbuffer(x,y) = c(x,y) ;
         }
```

This second embodiment of the Solid Clipping method employs two passes through the solids. This method classifies points on the surface of the solids as being in front of or behind the front clipping plane.

Figure 6A:
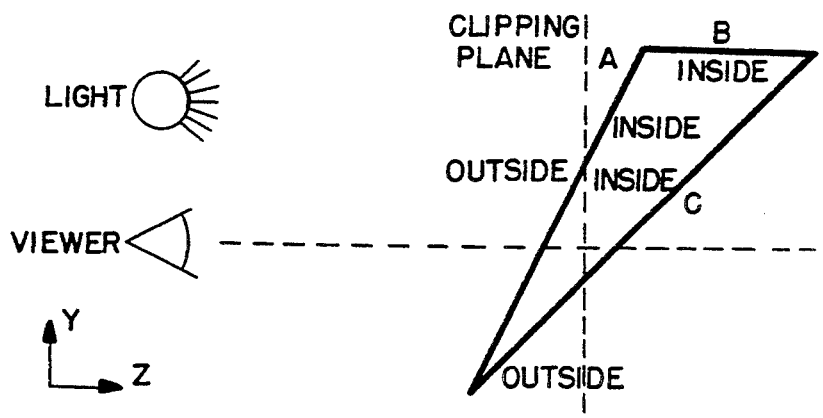
FIGS. 6a and 6b illustrate the determination of odd and even parity of faces in front of a clipping plane, as in FIGS. 5a and 5b, and further show, in FIG. 6b, the result obtained after clipping and projecting the volume of the solid in front of the clipping plane back onto the clipping plane.
Figure 6B:
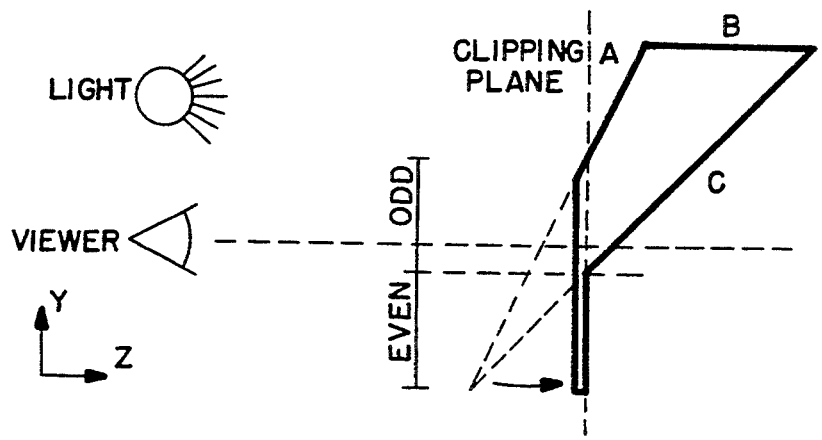
Figure 7A:
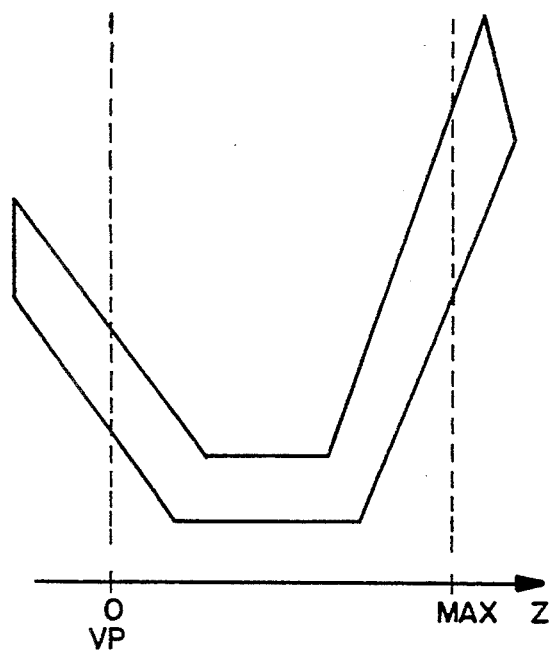
Figure 7B:
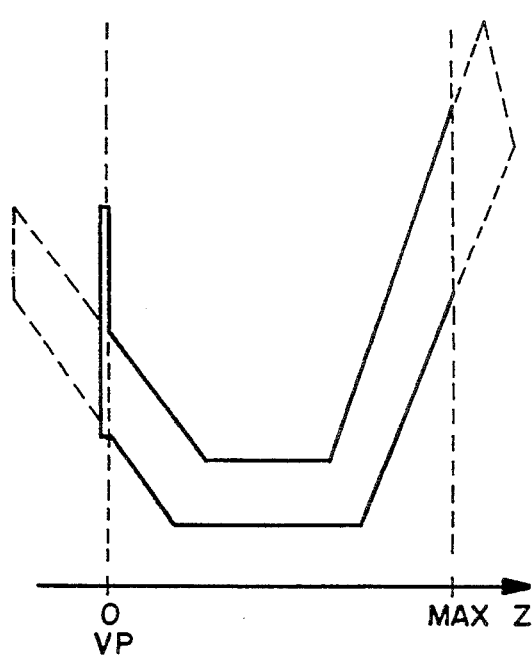
Figure 7C:
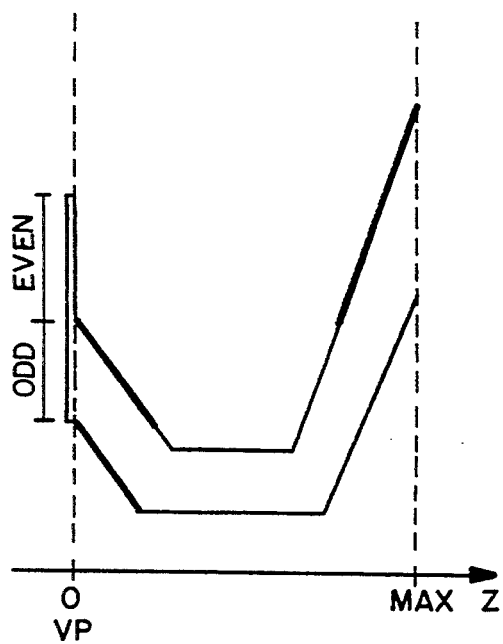
Figure 7D:
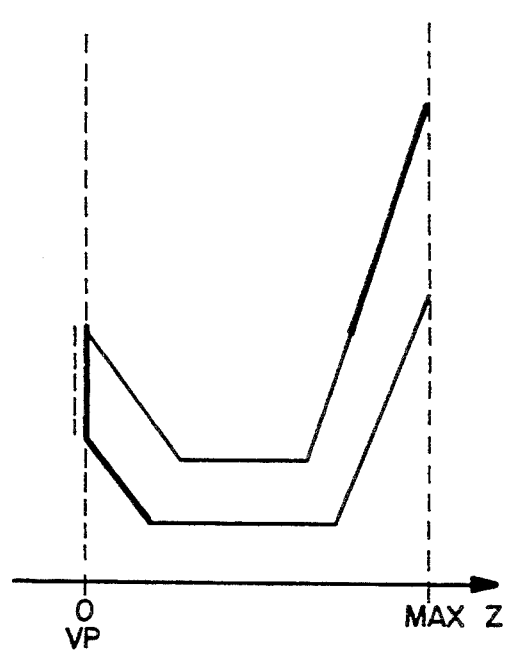

However, instead of constructing two sets of surface points in image space, as is done in the second embodiment of the method, object space techniques may be employed to classify surfaces as to whether they are in front of or behind the front clipping plane. As seen in FIG. 6a, a polygon is decomposed into parts that are inside the clipping volume, and parts that are outside of the clipping volume. Those parts inside the clipping volume, i.e. behind the front clipping plane or in front of a back clipping plane, are treated in a conventional fashion. That is, the "inside" parts are displayed using standard techniques for scan-conversion and shading. However, instead of removing the "outside" parts in front of the front clipping plane, the outside parts are instead projected or collapsed along the z-axis onto the front clipping plane, as seen in FIG. 6b. This operation produces a deformed version of the polyhedron which may have overlapping faces coplanar with the front clipping plane. The result is that surfaces that are outside of the clipping plane are collapsed into a zero volume region that is coincident with the clipping plane.

The boundary of this polyhedron has the following two properties. First, the boundary is a closed two-cycle. Second, for a particular pixel, N is defined to be a number of surfaces projected onto the clipping plane. As a result, a pixel is considered to be in the cross-section of the clipping plane with the solid, if N is odd, and a pixel is considered to be outside the cross-section, if N is even.

The first property of the new polyhedron ensures that the back faces are never displayed. The second property provides a criterion to identify those pixels where the projected portions of the original polygons should be displayed. The image of the cross-section is obtained only for those pixels on the front clipping plane where the number of projected surfaces (N) is odd.

The projection operation is useful because typical scan conversion techniques have a limited range of depth (z). The projection is obtained by replacing the z-coordinate of each vertex of the clipped portions with the depth (z-coordinate) of the front clipping plane, thereby effectively collapsing these surfaces onto the front clipping plane. One advantage of this technique is that every solid (and its faces) need be processed only once. However, this is achieved by providing additional memory for storing the set of faces that lie in front of the clipping plane.

The method of this third embodiment is described by the following pseudo-code.

```
 /*
  *    SOLID CLIPPING: METHOD 3
  *    The position of solids is not restricted to
          z-buffer depth range.
  *
  *    'zbuffer' and 'cbuffer' store the depth
          and the color at each pixel.
  *    'parity' is a bit plane for storing the parity
          of the number of faces projected onto a
          particular pixel.
  *
  *    'zfront' and 'zback' give the depth of the front
          and back clipping plane at each pixel.
  */
 /*
  *    Initialization
  */
 FORALL pixels (x,y) DO
 {
     zbuffer(x,y) = zback ;
     cbuffer(x,y) = cback ;
     parity(x,y) = 0 ;
 }
 FORALL solids s DO
 }
 /*
  *    Preprocess all surfaces in object space
  */
 FORALL faces f of s Do
 {
     CLIP f against the clipping plane and store the
        results in two sets of polygons ffront and
        fin ;
     PROJECT all objects in ffront along the z-axis on
        the front clipping plane ;
 }
 CLEAR_BBX ; /* The bounding box encloses all pixels
        where the parity bit has been changed. */
 /*
  *    Render all primitives into the z-buffer and
  *    determine the location of cross-sections.
  */
 FORALL faces f in ffront DO
     FORALL pixels (x,y) covered by f DO
         IF (z(x,y) < = zfront)
         {
             parity(x,y) = !parity(x,y) ;
             UPDATE_BBX(x,y) ;
         }
 FORALL faces f in fin DO
     FORALL pixels (x,y) covered by f DO
         IF (z(x,y) < zbuffer(x,y))
         {
             zbuffer(x,y) = z(x,y)
             cbuffer(x,y) = c(x,y)
         }
 /*
  *    Assign a color to the pixels that contain
  *       cross-sections and update the z-buffer at
          those pixels.
  */
 FORALL pixels (x,y) in bounding box DO
     IF (parity(x,y))
     {
         cbuffer(x,y) = color_of_cross_section(s) ;
         zbuffer(x,y) = zfront ;
         parity(x,y) = 0 ; /* Reset parity to avoid
                              reinitialization for the
                              next solid. */
     }
 }
```

This third embodiment of the Solid Clipping method is applicable to all z-axis positions of the clipping planes. That is, even if the clipping planes are positioned at z-32

O and z=zmax, i.e. delimiting the available depth range, the method operates correctly. For this third embodiment, it is assumed that geometry preprocessing, i.e. transformation and clipping, are accomplished by the geometric processing unit 18 with a larger depth range using, by example, floating point, and can thus accommodate coordinates that are outside of the (integer) depth range of the zbuffer 36 and the scan-conversion processor 20. The preprocessor thus ensures that all objects are mapped into the depth range $0 < = z < =$ zmax. As a result, the scan-conversion process always generates valid depth values.

If all solids are entirely inside the depth range of the z-buffer, the steps for clipping and projecting the primitives can be omitted. These steps are done "on-the-fly" by the Solid Clipping method illustrated in FIG. 7a–7d during the first pass described in the following pseudo-code. This embodiment also demonstrates how the method is adapted to non-planar clipping surfaces, or to clipping planes that are not perpendicular to the z-axis. The clipping surfaces may be described as functions that take the pixel coordinates as an argument, e.g. 'zfront(x,y)'. For each pixel, the function returns the depth of the clipping plane at that pixel. This function can be specified either explicitly, e.g. as a plane equation for tilted clipping planes, or discretized. In the latter case the buffer zfront 44 of FIG. 1b stores the depth of the front clipping surface at each pixel. This latter alternative is useful if the clipping surface is complex and therefore difficult to implement in hardware.

```
/*
 *    SOLID CLIPPING: METHOD 4
 *    All solids lie within the z-buffer depth range.
        complex clipping surfaces.
 *
 *    'zbuffer' and 'cbuffer' are storing the depth
        and the color at each pixel.
 *    'parity' is a bit plane for storing the parity
        of the number of faces projected onto a
        particular pixel.
 *
 *    'zfront' and 'zback' give the depth of the front
        and back clipping planes at each pixel.
        They may be implemented as a constant, a
        function, or as the two buffers 44 and 46
        that define the shape of these clipping
        surfaces.
 */
FORALL pixels (x,y) DO
{
  zbuffer(x,y) = zback(x,y) ;
  cbuffer(x,y) = cback(x,y) ;
  parity(x,y) = 0 ;
}
FORALL solids s DO
{
  CLEAR_BBX ; /* The bounding box encloses all
      pixels where the parity bit is changed. */
  /* PASS 1:  Render all primitives into the z-buffer
            and determine the location of
            cross-sections. */
  FORALL faces f of s DO
    FORALL pixels (x,y) covered by f DO
      IF (z(x,y) <= zfront(x,y))
      {
        parity(x,y) = !parity(x,y) ;
        UPDATE_BBX(x,y) ;
      }
      ELSE IF (z(x,y) < zbuffer(x,y))
      {
        zbuffer(x,y) = z(x,y) ;
        cbuffer(x,y) = c(x,y) ;
      }
  /* PASS 2:  Assign a color to the pixels that
            contain cross-sections and update the
            z-buffer at those pixels. */
  FORALL pixels (x,y) in bounding box DO
    IF (parity(x,y))
    {
      cbuffer(x,y) = color_of_cross_section(s) ;
      zbuffer(x,y) = zfront(x,y) ;
      parity(x,y) = 0 ; /* Reset parity to avoid
                          reinitialization for the
                          next solid. */
    }
}
```

The various embodiments of the Solid Clipping method presented above can be extended to accomplish the following results.

The cross-section of the clipping plane, with the complement of all solids, or only certain solids, may be displayed. This is advantageous to "look ahead" while inspecting large and complex scenes. In this mode, the interior of a solid is displayed where the cross-section was shown by the Solid Clipping method described above.

That is, by initializing the parity per pixel to odd (1) instead of even (0), every pixel outside of a cross-section will eventually be determined to have odd parity and will therefore be considered to be a cross-section. On the other hand, every pixel lying inside an actual cross-section will be rendered without the predefined cross-section surface characteristic. The result is an "inverted" image that displays all portions of the image in a predefined color, e.g., black. Portions where the clipping plane intersects solids are displayed as "windows" into the solid which enables a viewer to "look-ahead" through the solid. An advantage to this approach is that the viewer is not confused as to whether a face is an interior face of a solid, and revealed by the clipping operation, or whether the face is on the surface of the solid.

Auxiliary surfaces, e.g. interior surfaces or dangling surfaces, are displayed and examined by representing those surfaces twice in a graphics data base maintained by the Host processor 12. This ensures that the parity for these surfaces is even, and does not corrupt the parity of the solid they are contributing to.

Additional clipping planes, e.g. for delimiting the clipping volume at the sides, the top, or the bottom (also known as the window boundaries), may be accounted for before or after the execution of the Solid Clipping method. With respect to hardware support offered by available workstation architectures, it is preferred to perform the window clipping before the Solid Clipping. Then, the remaining solids are subjected to the Solid Clipping method of the invention.

In regard to system hardware requirements for implementing the methods of the invention, in addition to a standard frame buffer (for colors), and a z-buffer (for depth values), only one extra bit per pixel, for the parity, is required.

Many solid modellers represent solids by their enclosing surfaces (boundary representation). Such modellers can take advantage of the Solid Clipping method for displaying cross-sections through solids.

As an example of the utility of the invention, one application that may benefit from the teaching of the invention is known as the Trickle Algorithm. The Trickle Algorithm is described by David A. Epstein, Frederik W. Jansen, and Jaroslaw R. Rossignac in "Z-Buffer Rendering From CSG: The Trickle Algorithm"

Technical Report RC 15182, IBM Research Division, T. J. Watson Research Center, Yorktown Heights, N.Y., November 1989, and by J. Rossignac and Jeffrey Wu, "Correct Shading of Regularized CSG Solids Using a Depth-Interval Buffer", Proceedings of the Eurographics Workshop on Graphics Hardware, 1990, Eurographics, September 1990. In general, the Trickle Algorithm enables the display of Constructive Solid Geometry (CSG) objects on a raster display without converting the object to its boundary representation. CSG describes solids as the boolean union, intersection and difference of primitive solids, e.g. half spaces, spheres, cylinders, etc.

The global algorithm proceeds as follows:

1. The CSG expression is transformed into a sum-of-products form that represents the object as the union of sub-objects that are constructed as the intersection of primitive objects.
2. Each of the products is scan-converted into a product buffer (P-Buffer). After the image of a product has been completely rendered into the P-Buffer, the P-Buffer contains the visible front faces of the product. This image is merged into a union-buffer (U-Buffer), using a z-buffer.

The following pseudo-code describes these two steps:
transform the object into a sum-of-products form
initialize the U-Buffer for each product do:
  compute the front pixels into the P-Buffer merge
    the result into the U-Buffer using a depth buffer The computation of the visible front pixels of a product is a more complicated procedure. The main idea is that the visible surface points of a product are on the front surface of the closest, front-facing surface that lies inside all other primitives. Finding that surface requires two buffers.

The first buffer is the P-Buffer that eventually holds the product's image. While the algorithm is in process, it stores, in the P-Buffer, the closest, front-facing points found thus far. The second buffer, a search buffer (S-Buffer), is used to search for front-facing surfaces that lie behind the surface stored in the P-Buffer. If such a surface is found, it replaces the surface stored in the P-Buffer. This causes the P-Buffer to advance, or "trickle" through the scene from front to back. The following pseudo-code details this technique.
initialize the P-Buffer to the background
while not done, circulate through the primitives of the produce and do:
  compute into the S-Buffer the next face that lies behind the P-Buffer
  at pixels where the next primitive face is front-facing do:
    copy the S-Buffer into the P-Buffer This description of the Trickle Algorithm is translated into appropriate code for execution by the Host processor 12.

Figure 8A:
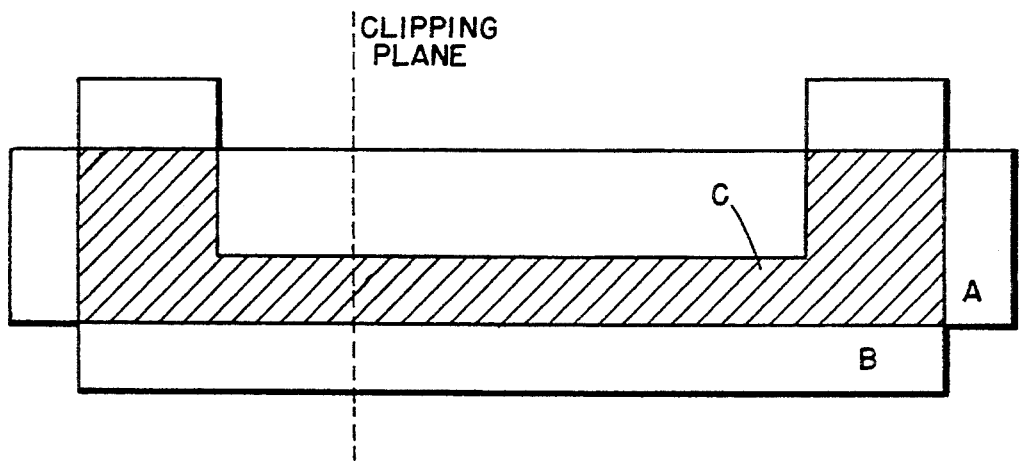
Figure 8B:
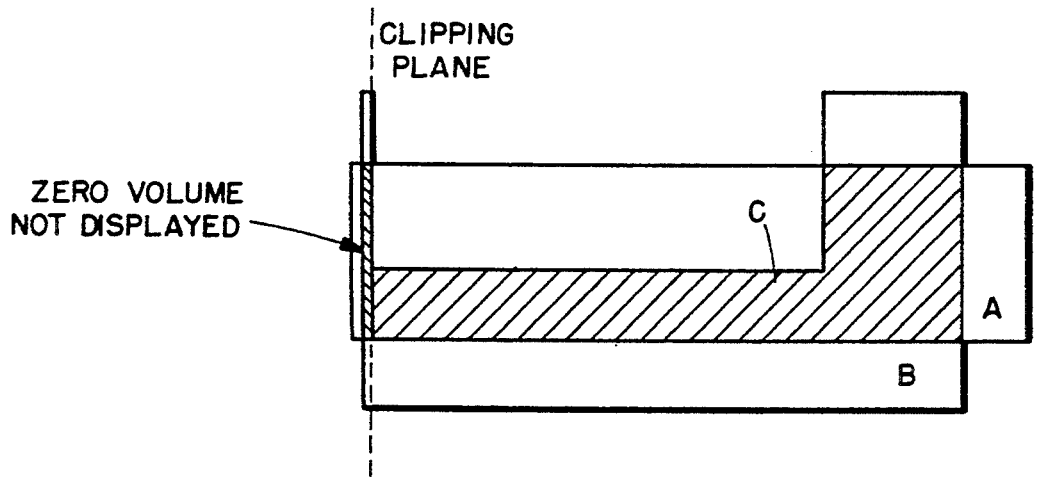
FIG. 8b shows a projection of the solids A and B onto a clipping plane, the projection having a zero volume.

While rendering, the Trickle Algorithm performs a regularization of the solid. By regularization, it is meant that non-manifold portions of the solid, e.g. dangling edges, dangling surfaces, or zero-volume portions of the solid are not displayed. Using this property, the Solid Clipping method of the invention is utilized in conjunction with the Trickle Algorithm. By projecting the surfaces outside of the clipping volume onto the clipped surface, the Solid Clipping method generates zero-volume portions of the solid outside of the cross-section area. FIGS. 8a and 8b provide an example. In FIG. 8a there is shown a solid C (crosshatched) that is described as the intersection of solids A and B. In FIG. 8b there are shown the projected solids, with the region in front of the clipping plane having zero volume. This zero volume portion is automatically removed during the operation of the Trickle Algorithm and is thus not displayed.

Having described the solid clipping method of the invention, and having provided several exemplary applications thereof, further variations and extensions thereof are now described.

Figure 10:
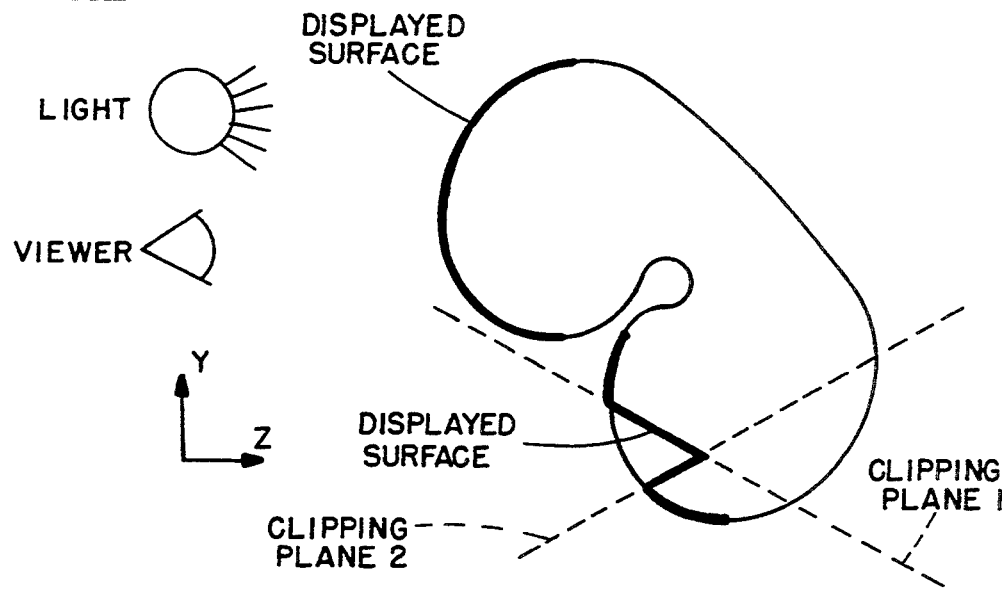
FIG. 10 shows a solid intersected by two clipping planes.

In many cases, it may be helpful to cut away a wedge shaped region of the object instead of slicing it with a plane, as shown in FIG. 10. The scene minus the wedge shaped region can be expressed as the union of two halfspaces. To compose the image, draw the scene using the first clipping plane, and then, without clearing the z-buffer, render the second scene over the first. This has the effect of taking the union of the two scenes. As many clipping planes as desired can be unioned together in this way; however, the scene must be redrawn for each clipping plane. The following pseudo-code illustrates this technique.

```
Solid clipping with multiple clipping planes:
set frame buffer to background;
set z-buffer to zmax;
for each clipping plane do
{
  set clipping plane to desired locations;
  for each solid do
  }
    render using the solid clipping method but
    without clearing the z-buffer and frame buffer;
  }
}
```

Figure 11:
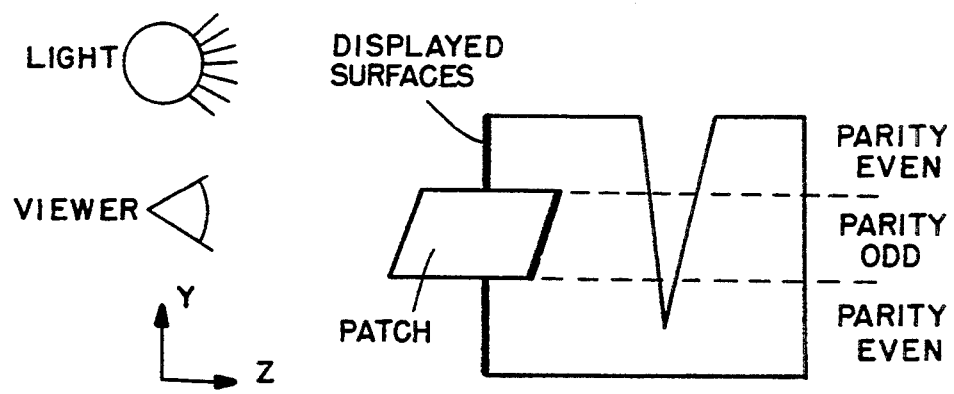
FIG. 11 shows a solid having a clipping surface or "patch".
Figure 5A:
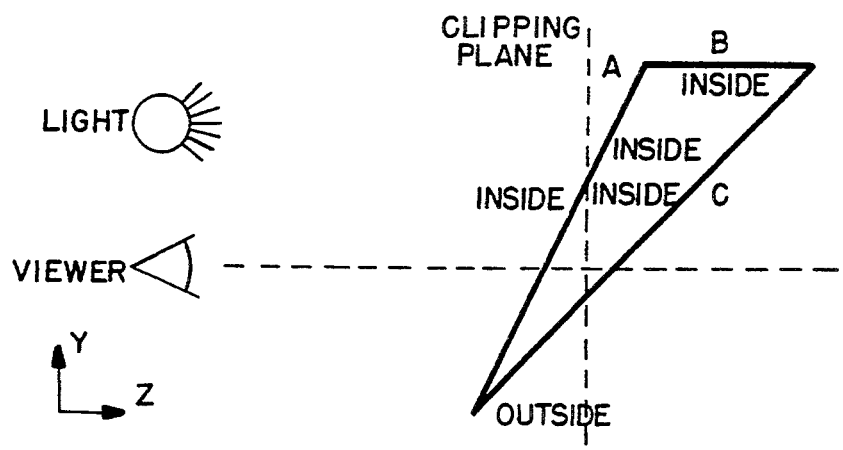
Figure 5B:
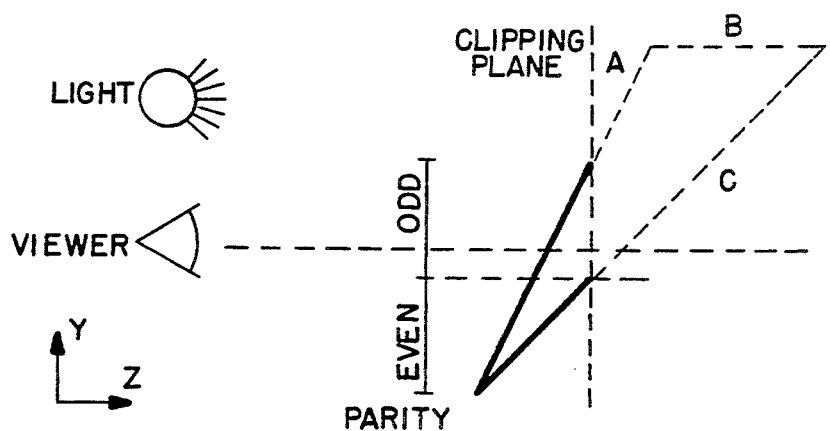

Clipping surfaces such as parametric patches may be useful to 'probe' an object. This is illustrated in FIG. 11. However, to clip each polygon against the patch, geometrically, is computationally expensive. As a result, the z-buffer 36 is used to clip each polygon, in conjunction with an additional z-buffer that is not shown in FIG. 1b. In this implementation, first scan convert the patch, then change the comparison function of the z-buffer 36 to accept the nearest pixels which are farther from the viewer than this surface, and then scan-convert the scene. This limits the clipping surface to patches that do not overlap themselves, from the viewpoint of the eye, and uses a double z-comparison test. The following pseudocode illustrates this technique.

```
solid clipping with surface patches:
set frame buffer to background,
set z-buffer1 and z-buffer2 to max;
render surface patch into z-buffer1;
for each solid do
{
  set parity bitplane to 0;
  for each polygon in solid do
  {
    draw polygon to frame buffer if z >
    z-buffer1 and z < z-buffer 2;
    invert pixels in parity plane if z >
    zbuffer1;
  }
  draw clipping surface using the parity
  bitplane as a mask so that only the regions
  where the parity is odd are written to the
  frame buffer and to the z-buffer;
}
```

In the previous description, the clipping plane was approximated by drawing a large polygon. Since this potentially scan converts a much larger area of pixels than is required, it may not be the most efficient technique. What is desired is a polygon, on the clipping plane, whose projection covers as efficiently as possible the pixels which are set in the parity buffer 40. If a bounding box is set around the pixels that are set in the parity buffer 40, or alternatively, a bounding box is set around the projection of the solid, then fewer pixels are required to be scan converted. For a scene with many small solids, this provides a significant savings in computational effort. To draw the cross-section, z-values must be correctly interpolated across the face of the cross-section. As a result, it becomes necessary to project a two-dimensional bounding box onto the surface of the clipping plane.

The following pseudo-code illustrates the use of bounding boxes.

```
solid clipping with bound boxes:
set frame buffer to background;
set z-buffer to zmax;
set union bitplane to 0;
initialize bound box;
set clipping plane to desired location;
for each solid do
{
  set parity bitplane to 0;
  for each polygon in solid do
  {
    clip polygon to halfspace defined by clipping
       plane;
    expand bounding box to enclose polygon;
    draw polygon and invert the parity bit for each
       pixel which is scan-converted regardless of the
       z-buffer test;
  }
  project bounding box onto clipping plane to find a
    polygon which overlaps the cross-section region;
  draw computed clipping plane , polygon using the
    parity bitplane and the union bitplane as a mask so
    that only the regions where the parity is odd and
    the union bitplane is not set are written to the
    frame buffer and to the z-buffer;
  where parity = 1, set union bitplane to 1;
}
```

While the invention has been particularly shown and described with respect to preferred embodiments thereof, it will be understood by those skilled in the art that changes in form and details may be made therein without departing from the scope and spirit of the invention.

Having thus described our invention, what we claim as new, and desire to secure by Letters Patent is:

1. A method for processing pixels to display a cross-sectioned image of a solid object, comprising the steps of:
for each pixel covered by an image of the solid object,
determining, as a function of a depth of a point on a clipping plane that projects onto the pixel, a parity value associated with the pixel, the parity value being determined by initially setting a parity flag to a predetermined state and thereafter toggling the parity flag once for each face of the solid object that lies behind the clipping plane and that projects onto the pixel; and
for each pixel having a predetermined type of parity value,
displaying the pixel with a visual characteristic selected to ,indicate that the point on the clipping plane that projects onto the pixel lies within an interior region of the solid object.

2. A method as set forth in claim 1 wherein the clipping plane is a front clipping plane, and wherein the step of determining a parity value associated with the pixel includes a step of maintaining a record of a number of faces of the solid object that have a point that projects onto the pixel, the faces being behind the front clipping plane.

3. A method as set forth in claim 2 wherein the predetermined type of parity value is odd parity, and wherein the parity value associated with a pixel is determined to be an odd parity value if an odd number of faces of the solid object project onto the pixel.

4. A method as set forth in claim 1 wherein the step of determining includes the initial step of:
collapsing, for a front clipping plane, any portion of the solid object that extends beyond the front clipping plane towards a viewer; and
collapsing, for a back clipping plane, any portion of the solid object that extends beyond the back clipping plane away from the viewer.

5. A method as set forth in claim 2 wherein the step of maintaining a record includes a step of generating a record of pixel coordinates of pixels that bound a region of the projection of points on the solid object that lie behind the front clipping plane.

6. A method for processing pixels to display a cross-sectioned image of a solid object, comprising the steps of:
for each pixel,
initializing in a pixel buffer means a depth stored for the pixel to a depth of a point on a back clipping plane that projects onto the pixel;
initializing in the pixel buffer means a display characteristic stored for the pixel to a predetermined display characteristic that indicates a background;
initializing in the pixel buffer means a parity flag stored for the pixel to a first parity indication;
for each pixel onto which projects a point on the face of the solid object;
if the depth of the point on the face that projects onto the pixel is greater than the depth of the point on a front clipping plane that projects onto the pixel,
changing the parity flag stored for the pixel to an opposite parity condition; and
if the depth of the point in the face that projects onto the pixel is greater than the depth of the point on the front clipping plane that projects onto the pixel, and if the depth of the point on the face that projects onto the pixel is less than the depth stored for the pixel,
setting within the pixel buffer means the display characteristic stored for the pixel to indicate an exterior surface of the solid object, and setting the depth stored for the pixel to the depth of the point on the face of the solid object that projects onto the pixel;
after processing each pixel, and for all pixels having a predetermined parity flag value,
setting, within the pixel buffer means, the pixel display characteristic to be equal to a predetermined characteristic selected to indicate that the point on the front clipping plane that projects onto the pixel lies within an interior region of the solid object; and
setting, within the pixel buffer means, the depth of the pixel to be equal to the depth of the point on the front clipping plane that projects onto the pixel.

7. A method as set forth in claim 6 wherein the predetermined parity flag value is odd.

8. A method as set forth in claim 6 wherein the step of changing includes a step of generating a record of those pixels that bound a region of the projection of the solid object where the depths of points on the faces of the solid object projecting onto those pixels are greater than the depth of points on the front clipping plane that project onto those pixels.

9. A method as set forth in claim 8 wherein the step of setting a pixel display characteristic stored includes an initial step of determining, for each pixel within the record, if the parity flag of the pixel is even or odd, and wherein the steps of setting the pixel display characteristic to be equal to a predetermined characteristic and setting the depth of the pixel to be equal to the depth of the point on the front clipping plane that projects onto the pixel are executed only for those pixels that are determined to have an odd parity flag.

10. A method for processing pixels to display a cross-sectioned image of a solid object, comprising the steps of:

during a first pass, and for each pixel onto which projects a face of the solid object, initializing a parity flag of the pixel to a first parity indication;

comparing a depth of a point on the face of the solid object that projects onto the pixel to a depth of a point on a front clipping plane that projects onto the pixel;

if the depth of the point on the face is less than or equal to the depth of the point on the front clipping plane, toggling the parity flag from a current parity indication to an opposite parity indication;

after examining all faces of the solid object that project onto pixels, and for all pixels having a parity flag set to a predetermined parity indication, setting, within a pixel buffer means, a pixel display characteristic to be equal to a predetermined characteristic selected to indicate that the point on the front clipping plane that projects onto the pixel lies within an interior region of the solid object; and setting, within the pixel buffer means, a depth stored for the pixel to be equal to the depth of the point on the front clipping plane that projects onto the pixel; and during a second pass, and for each pixel onto which projects a face of the solid object, comparing a depth of a point on the face of the solid object that projects onto the pixel to a depth of a point on a back clipping plane that projects onto the pixel;

if the depth of the point on the face that projects onto the pixel is greater than the depth of the point on the front clipping plane that projects onto the pixel and is less than or equal to the depth of the point on the back clipping plane that projects onto the pixel, setting, within the pixel buffer means, a pixel display characteristic to be equal to a characteristic that indicates an exterior surface of the solid object; and setting, within the pixel buffer means, the depth of the pixel to be equal to the depth of the point on the face that projects onto the pixel.

11. A method for processing pixels to display a cross-sectioned image of a solid object, comprising the steps of:

for each pixel initializing in a pixel buffer means a depth stored for the pixel to a depth of a point on a back clipping plane that projects onto the pixel;

initializing in the pixel buffer means a display characteristic stored for the pixel to a predetermined display characteristic that indicates a background;

initializing in the pixel buffer means a parity flag of the pixel to a first parity indication;

initializing a depth of a front clipping plane to lie in front of the solid object;

initializing a depth of a back clipping plane to be equal to a first depth originally associated with the front clipping plane;

for each pixel onto which projects a face of the solid object;

comparing a depth of a point on the face of the solid object that projects onto the pixel to a depth of a point on the back clipping plane that projects onto the pixel; if the depth of the point on the face is less than or equal to the depth of the point on the back clipping plane, changing the parity flag of the pixel to an opposite parity condition; and after processing each pixel, and for all pixels having a predetermined parity flag value, setting, within the pixel buffer means, a pixel display characteristic to be equal to a predetermined characteristic selected to indicate that the point on the back clipping plane that projects onto the pixel is within an interior region of the solid object; and setting, within the pixel buffer means, a depth stored for the pixel to be equal to the first depth of a point on the front clipping plane that projects onto the pixel;

reinitializing the depth of the front clipping plane to be equal to the first depth of the front clipping plane;

reinitializing the depth of the back clipping plane to be equal to a second depth originally associated with the back clipping plane; and for each pixel onto which projects a face of the solid object, comparing a depth of a point on the face that projects onto the pixel to a depth of a point on the front clipping plane that projects onto the pixel and to a depth of a point on the back clipping plane that projects onto the pixel;

if the depth of the point on the face that projects onto the pixel is greater than the depth of the point on the front clipping plane that projects onto the pixel and is less than or equal to the depth of the point on the back clipping plane that projects onto the pixel, setting, within the pixel buffer means, a pixel display characteristic to be equal to a characteristic that indicates an exterior surface of the solid object; and setting, within the pixel buffer means, the depth stored for the pixel to be equal to the depth of the 12. A method for processing pixels to display a cross-sectioned image of a solid object, comprising the steps of:

for each pixel, initializing in a pixel buffer means a depth stored for the pixel to a depth of a point on a back clipping plane that projects onto the pixel;

initializing in the pixel buffer means a display characteristic stored for the pixel to a predetermined display characteristic that indicates a background;

initializing in the pixel buffer means a parity flag of the pixel to a first parity indication;

preprocessing all faces of the solid object to determine those faces and portions of faces that lie in front of a front clipping plane and those faces and portion of faces that lie behind the front clipping plane; and projecting onto the front clipping plane, along a z-axis, all faces and portions of faces that extend in front of the front clipping plane;

for all pixels onto which projects a face that extends in front of the front clipping plane, comparing a depth of a point on the face that projects onto a pixel to a depth of a point on the front clipping plane that projects onto the pixel and, for a depth of a point on the face that projects onto the pixel that is less than or equal to a depth of a point on the front clipping plane that projects onto the pixel;

changing the parity flag of the pixel to an opposite parity condition;

for all pixels onto which projects a face that is behind the front clipping plane, comparing a depth of a point on the face that projects onto a pixel to a depth stored for the pixel and, for a depth of a point on the face that projects onto the pixel that is less than the depth stored for the pixel;

setting, within a pixel buffer means, a pixel display characteristic to be equal to a characteristic that indicates an exterior surface of the solid object; and setting, within the pixel buffer means, a depth stored for the pixel to be equal to the depth of the point on the face that projects onto the pixel; and for all pixels determined to have a predetermined parity flag value, setting, within a pixel buffer means, a pixel display characteristic to be equal to a predetermined characteristic selected to indicate that the point on the front clipping plane that projects onto the pixel lies within an interior region of the solid object; and setting, within the pixel buffer means, the depth stored for the pixel to be equal to the depth of the point on the front clipping plane that projects onto the pixel.

13. A method as set forth in claim 12 wherein the step of projecting includes a step of replacing a depth stored for the pixel with a depth of the point on the front clipping plane that projects onto the pixel.

14. A method as set forth in claim 12 wherein the step of changing the parity flag of the pixel to an opposite parity condition includes a step of generating a bounding box of pixel coordinates for maintaining a record of pixels that bound a region of the projection of the solid object where the depths of points on the face of the solid object are equal to or less than the depth of points on the front clipping plane that project onto the pixels, and wherein the steps of setting occur only for those pixels determined to be within the region.

15. A method for processing pixels to display a cross-sectioned image of a solid object, comprising the steps of:

for each pixel, initializing in a pixel buffer means a depth stored for the pixel to a depth of a point on a back clipping plane that projects onto the pixel;

initializing in the pixel buffer means a display characteristic stored for the pixel to a predetermined display characteristic that indicates a background;

initializing in the pixel buffer means a parity flag of the pixel to a first parity indication;

for each pixel onto which projects a face of the solid object, comparing a depth of a point on the face of the solid object that projects onto the pixel to a depth of a front clipping plane that projects onto the pixel;

if the depth of the point on the face that projects onto the pixel is equal to or less than the depth of the point on the front clipping plane that projects onto the pixel, changing the parity flag of the pixel to an opposite parity condition;

if the depth of the point on the face that projects onto the pixel is greater than the depth of the point on the front clipping plane that projects onto the pixel, and if the depth of the point on the face that projects onto the pixel is less than a depth stored for the pixel, setting, within the pixel buffer means, a pixel display characteristic to be equal to a characteristic that indicates an exterior surface of the solid object; and setting, within the pixel buffer means, a depth stored for the pixel to be equal to the depth of the point on the face that projects onto the pixel; and for all pixels having a predetermined parity flag value, setting, within the pixel buffer means, a pixel display characteristic to be equal to a predetermined characteristic selected to indicate that the point on the front clipping plane that projects onto the pixel lies within an interior region of the solid object; and setting, within the pixel buffer means, the depth stored for the pixel to be equal to the depth of point on the front clipping plane that projects onto the pixel.

16. Apparatus for processing pixels to display a cross-sectioned image of a solid object, comprising:

pixel buffer means for storing information specifying characteristics of a plurality of pixels onto which project a face of a solid object, including a depth of each pixel to a point on a face of the solid object relative to a viewing plane and a visual characteristic of each pixel;

means for determining, as a function of a depth of a point on a clipping plane that projects onto a pixel, a parity value of the pixel, the parity value being determined by intially setting a partity flag to a predetermined state and thereafter toggling the parity flag once for each face of the solid object that lies pixel; and means, coupled to the determining means, for storing information for specifying the determined parity value of each pixel; wherein said determining means further includes means for storing within said pixel buffer means, for each pixel having a stored parity value that is equal to a predetermined parity value, information that specifies a predetermined visual characteristic selected to indicate that the point on the clipping plane that projects onto the pixel is within an interior region of the solid object, and information that specifies that a depth stored for the pixel is equal to the depth of the point on the clipping plane that projects onto the pixel.

17. Apparatus as set forth in claim 16 wherein the clipping plane is a front clipping plane, and wherein the determining means includes means for maintaining a record of a number of faces and portions of faces of the solid object that have a point that projects onto the pixel, the faces and portions of faces being behind the front clipping plane.

18. Apparatus as set forth in claim 17 wherein the predetermined type of parity value is odd, and wherein a pixel is determined to have an odd parity value if an odd number of faces and portions of faces of the solid object behind the front clipping plane have a point that projects onto the pixel.

19. Apparatus as set forth in claim 16 and further including means, coupled to the determining means and responsive to the operation thereof, for storing a record of pixel coordinates of those pixels that bound a region of the projection of faces of the solid object where the depths of points on the faces of the solid object projecting onto those pixels are greater than the depth of points on the front clipping plane that project onto those pixels.

20. A graphics display system, said graphics display system including an output for driving display means having a plurality of pixels, said graphics display system comprising:

a frame buffer comprising,
  a first memory for storing, for each pixel of the display means, a specification of a visual characteristic of the pixel;
  a depth buffer for storing, for each pixel of the display means, a specification of a depth, relative to a reference plane, of a point that projects onto the pixel from a face of a solid object being displayed; and
  a second memory for storing, for each pixel onto which projects a face of the solid object, a parity value of the pixel; said graphics display system further comprising,
data processing means having an input for receiving a specification of a solid object to be displayed on the display means, said data processing means being bidirectionally coupled to said first memory, to said second memory, and to said depth buffer for storing data therein and for reading data therefrom while preparing a specification of a solid object for display on the display means, said data processing means comprising,
  means for determining, as a function of a depth of a point on at least one clipping plane that projects onto a pixel, a parity value of the pixel, said determining means updating a corresponding location within said second memory with the determined parity value, the parity value for each pixel being determined by initially setting a corresponding parity flag within said second memory to a predetermined state and thereafter toggling the parity flag once for each face of the solid object that lies behind the at least one clipping plane and that projects onto the pixel;
  means, responsive to the parity values stored within said second memory, for storing within said first memory, for each pixel having a stored parity value that is equal to a first predetermined parity value, a specification of a visual characteristic that indicates that the point on the at least one clipping plane that projects onto the pixel is within an interior region of the solid object; and
  means, responsive to the parity values stored within said second memory, for storing within said depth buffer, for each pixel having a stored parity value that is equal to the first predetermined parity value, a depth equal to the depth of the point on the clipping plane that projects onto the pixel.

21. A graphics display system as set forth in claim 20 wherein said data processing means further comprises:
  means for storing within said first memory, for each pixel having a stored parity value that is equal to a second predetermined parity value, a specification of a visual characteristic that indicates that a point on a face of the solid object that projects onto the pixel is located on an exterior region of the solid object; and
  means for storing within said depth buffer, for each pixel having a stored parity value that is equal to the second predetermined parity value, a depth equal to the depth of the point on the face that projects onto the pixel.

22. A graphics display system as set forth in claim 20 and further comprising a third memory for storing top, bottom, left, and right coordinates of pixels that delineate a region wherein said parity value determining means changes a stored parity value from an initial parity value.

23. A graphics display system as set forth in claim 20 wherein the solid object is a non-convex solid object.

* * * * *

UNITED STATES PATENT AND TRADEMARK OFFICE
CERTIFICATE OF CORRECTION

PATENT NO. : 5,428,716
DATED : June 27, 1995
INVENTOR(S) : Daniel A. Brokenshire, et al It is certified that error appears in the above-indentified patent and that said Letters Patent is hereby corrected as shown below:

Col. 17, line 11, claim 9, after "includes" insert --for the pixel to be equal to a predetermined characteristic--.

Col. 18, line 58, claim 11, after "the" insert --point on the face that projects onto the pixel--.

Col. 20, line 48, claim 16, "intially" should read --initially--.

Col. 20, line 51, claim 16, after "lies" insert --behind the clipping plane and that projects onto the--.

Signed and Sealed this

Nineteenth Day of September, 1995

Attest:

BRUCE LEHMAN

Attesting Officer    Commissioner of Patents and Trademarks